UNITED STATES PATENT OFFICE.

RUDOLF ALLERT, OF BROOKLYN, NEW YORK.

APPARATUS FOR DISSOLVING AND SUPPLYING LUPULINE TO BEER.

SPECIFICATION forming part of Letters Patent No. 411,563, dated September 24, 1889.

Application filed February 6, 1889. Serial No. 298,853. (No model.)

*To all whom it may concern:*

Be it known that I, RUDOLF ALLERT, of Brooklyn, in the county of Kings and State of New York, a citizen of the German Empire, have invented certain new and useful Improvements in Apparatus for Dissolving and Supplying Lupuline to Beer, of which the following is a specification.

It is a well-known fact that in boiling the wort with hops nearly all the aroma of the latter is lost, as the same is passed off through the top of the hop-kettle. Many attempts have been made to impregnate the beer with the aromatic substance contained in the hops either by bringing the hop-beer in the hop-jack or cooling-pan in contact with a portion of the hops or by extracting the aroma from a part of the hops by boiling the same with wort, which extract was then added to the beer when in the cellar-casks. In the former case, however, a large portion of the aroma was lost, as the escaping vapors carry along the oil of hops and leave but a small percentage in the beer, while the addition of an extract of hops to the casks in the cellar is insufficient, as the beer in its cold state absorbs but a small quantity of the aroma, and as this operation requires considerable care and attention.

It is well known that the aroma of hops is contained in a yellowish gum, the so-called "lupuline," which is contained between the leaves of the hops and which forms from about eight to ten per cent. of the weight of the same. If the leaves of the hops are opened by passing the hops through a so-called "hop-mill" or apparatus for separating the leaves from the stems of the hops and then carefully screening said comminuted hops, the lupuline is obtained as a yellowish powder. The hops remaining on the screens are then added to the beer in the hop-kettle, while the lupuline is dissolved and mixed with the beer when the same is in a luke-warm condition, being neither too hot nor too cold. For this purpose I have devised an apparatus by which the lupuline or hop-flour is gradually dissolved and added to the beer without any loss in aroma, the beer being then transferred to the fermenting-vats.

In the accompanying drawings, Figure 1 represents a side elevation of a tubular beer-cooler with my improved apparatus for dissolving and supplying the lupuline to the beer passing over said cooler. Fig. 2 is a vertical central section of my improved apparatus, drawn on a larger scale; and Fig. 3 is a vertical transverse section through the beer-cooler, showing the lupuline-vessel in side view and the mixing-cup in section.

Similar letters of reference indicate corresponding parts.

A in the drawings represents a steam-jacketed vessel, into which the hop-flour or lupuline screened off from the hops is placed by being introduced into said vessel through a top opening closed by a detachable cap *a*. Into the neck *b* of the vessel A is placed a stopper B, of felt or other filtering material, which is retained in position by a cap $b'$, screwed onto the neck, said cap also serving to form connection with the flanged end of a goose-neck pipe C, which forms the connection of the lupuline-vessel A with a cup-shaped vessel D, that is attached by fastening-screws *d*, or otherwise, to the lower part of a Baudelotte beer-cooler E, as shown in Figs. 1 and 3.

The vessel A is provided with a thermometer *t*, that indicates the temperature at the interior of the vessel A, and the supply-pipe F for the hot beer, said supply-pipe having a funnel-shaped upper end *f* and an overflow-pipe $f'$. The hot beer is supplied to the pipe F by a short branch pipe *g* on the supply-pipe G of the beer-cooler E, said branch pipe having a faucet $g'$ for shutting off the supply. The supply-pipe terminates near the bottom of the vessel A and causes the hot beer to pass through the lupuline in the same. The hot beer gradually dissolves the lupuline, the solution passing through the felt stopper B and the goose-neck pipe C into the cup D, from which it is conveyed by overflow to the beer trickling over the tubes of the cooler. The filtering-stopper B prevents any undissolved lupuline from being conducted from the vessel A to the cup D. The upper edge of the overflow-cup D is provided with a backwardly-inclined flange $d'$, that forms contact with one of the tubes of the cooler, so as to convey some of the beer which has been (No Model.)
P. ANDERSEN.
FIFTH WHEEL FOR VEHICLES.
No. 411,564. Patented Sept. 24, 1889.
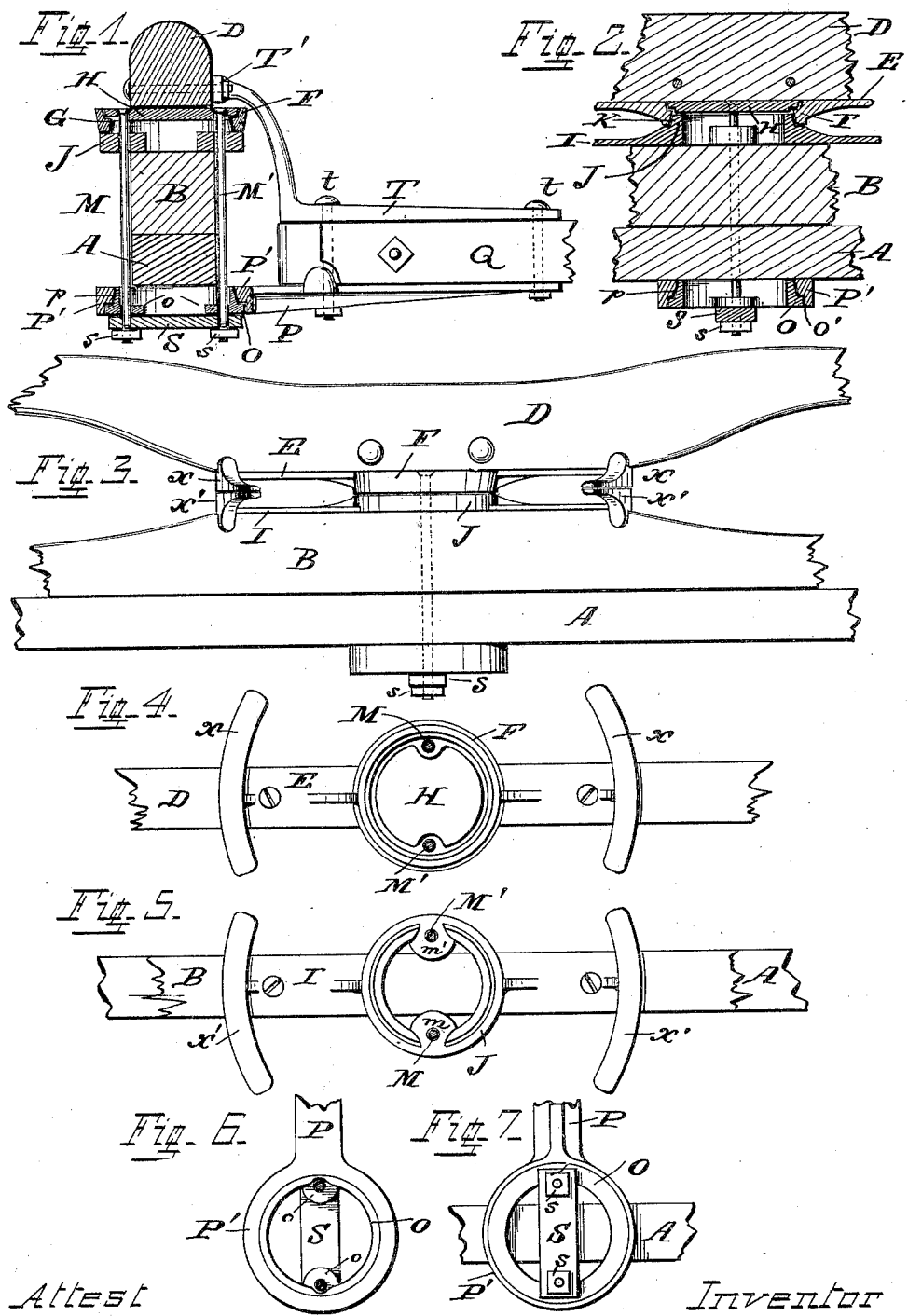
Attest
Alfred M. Allen
George Hridman
Inventor
Peter Andersen
by Arthur Stem Atty.